US008958551B2

(12) United States Patent
Brown

(10) Patent No.: US 8,958,551 B2
(45) Date of Patent: Feb. 17, 2015

(54) MULTI-DIMENSIONAL MONTGOMERY LADDERS FOR ELLIPTIC CURVES

(75) Inventor: Daniel R. Brown, Mississauga (CA)

(73) Assignee: Certicom Corp., Mississauga (CA)

( * ) Notice: Subject to any disclaimer, the term of this patent is extended or adjusted under 35 U.S.C. 154(b) by 727 days.

(21) Appl. No.: 12/145,758

(22) Filed: Jun. 25, 2008

(65) Prior Publication Data

US 2009/0003590 A1    Jan. 1, 2009

Related U.S. Application Data

(60) Provisional application No. 60/946,634, filed on Jun. 27, 2007.

(51) Int. Cl.
*H04K 1/00* (2006.01)
*H04L 9/00* (2006.01)
*H04L 9/30* (2006.01)
*H04L 9/28* (2006.01)
*G06F 7/72* (2006.01)

(52) U.S. Cl.
CPC ..................................... *G06F 7/725* (2013.01)
USPC ............................................ 380/30; 380/28

(58) Field of Classification Search
USPC ............................................ 380/28, 29, 30
See application file for complete search history.

(56) References Cited

U.S. PATENT DOCUMENTS

| 6,782,100 | B1 | 8/2004 | Vanstone et al. | |
|---|---|---|---|---|
| 7,835,517 | B2* | 11/2010 | Akishita et al. | 380/30 |
| 2003/0142820 | A1* | 7/2003 | Futa et al. | 380/30 |
| 2005/0283514 | A1* | 12/2005 | McIvor et al. | 708/491 |
| 2006/0029222 | A1* | 2/2006 | Lambert et al. | 380/28 |
| 2008/0049931 | A1* | 2/2008 | Vasyltsov | 380/28 |

OTHER PUBLICATIONS

Hankerson, D. et al; Guide to Elliptic Curve Cryptography; 2004; pp. 102 to 103; Chapter 3; Springer-Verlag, New York.

* cited by examiner

*Primary Examiner* — Azizul Choudhury
(74) *Attorney, Agent, or Firm* — Rowand LLP

(57) ABSTRACT

An algorithm is provided having a matrix phase and point addition phase that permits computation of the combination of more than two point multiples. The algorithm has particular utility in elliptic curve cryptography (ECC) such as for computing scalar multiplications in, e.g. batch ECC operations, accelerating Lenstra's ECM factoring algorithm, exploiting expanded ECC certificates (which contain pre-computed multiples of a party's public key), incremental hashing based on elliptic curves, accelerating verification of ECDSA signatures, etc.

4 Claims, 3 Drawing Sheets

MULTI-DIMENSIONAL MONTGOMERY LADDERS FOR ELLIPTIC CURVES

CROSS-REFERENCE TO RELATED APPLICATIONS

This application claims priority from U.S. Provisional Patent Application No. 60/946,634 and Canadian Patent Application No. 2,593,723 both filed on Jun. 27, 2007, the contents of which are hereby incorporated by reference.

TECHNICAL FIELD

The present invention relates generally to elliptic curve cryptography and has particular utility in elliptic curve scalar multiplication.

BACKGROUND

Elliptic curve cryptosystems rely upon the intractability of the discrete log problem in an elliptic curve over a finite field. The curve is defined by a series of points having coordinates x and y that satisfy the equation $y^2=x^3+ax+b$. Each coordinate x, y is an element of the underlying field as each point is defined by a pair of field elements. Elliptic curve operations involve addition of points which involves algorithms using both x and y coordinates of the points. However, computation of the y coordinate resulting from the addition of two points is computationally intensive.

Elliptic curve cryptosystems require point multiplications, i.e. kG which is the k-fold addition of the point G, in many operations. For example, a public key is a point multiple of a seed point P by a secret integer k, i.e. the key pair is a private key k and a public key kP. Other operations require the computation of differences of point multiples. For example, verification of a signature performed using the ECDSA requires computation of sP−eQ and so involves two point multiplications and a subtraction. Conventional point addition renders this computationally intensive.

Montgomery observed that, for some elliptic curves, the x-coordinate of the point P+Q, where + is elliptic curve addition, could be calculated from the x-coordinate of the three points P, Q and Q−P.

Using this observation, Montgomery proposed that a value for kG, i.e. the k-fold addition of G, could be obtained by computing a sequence of pairs of x-coordinates of two points P=sG and Q=(s+1)G, for appropriately selected values of s. This sequence has a property that Q−P=G and, as such, the difference of the points is known. Therefore, P+Q=(2s+1)G can be computed without using a y-coordinate. The other element of the next pair is either 2sG=2P or 2(s+1)G=2Q, either of whose x-coordinate can be computed without y-coordinates.

In Montgomery's method, the x-coordinate of the addition of two points $Q_1+Q_2$ can be computed from the x-coordinates of $Q_1$, $Q_2$ and $Q_1-Q_2$ as follows: Let $Q_1=(x_1, y_1)$ and $Q_2=(x_2, y_2)$ with $Q_1 \neq Q_2$. Now, let $Q_1+Q_2=(x_3, y_3)$ and $Q_1-Q_2=(x_4, y_4)$. Then, using the group law addition formulas, for curves defined over fields of characteristic two it can be verified that:

$$x_3 = x_4 + \frac{x_2}{x_1+x_2} + \left(\frac{x_2}{x_1+x_2}\right)^2.$$

It may be noted that a different formula is used for curves defined over a prime field. The formula for an elliptic curve $y^2=x^3+ax+b$ defined over a prime field would be:

$$x_3 = -x_4 + \frac{2(2b+(a+x_1x_2)(x_1+x_2))}{(x_2-x_1)^2}$$

Once $x_3$ is known, the computation may be repeated using $x_3$ and a point that differs from $x_3$ by a known value to compute a new $x^{3'}$. Typically, where a multiple of P is required, the initial points are P and 2P with a difference of P that allows rapid reiterative computations of kP.

This technique permits the rapid computation of the x-coordinate of a point multiple. If the y-coordinate is needed in a cryptographic operation, the corresponding y-coordinate may be recovered efficiently using the technique described in U.S. Pat. No. 6,782,100.

For certain special kinds of elliptic curves, performing the above computations using only x-coordinates can be faster than other efficient implementation methods which may require computation of the corresponding y-coordinate for each point. Montgomery has defined a class of prime field curves for which not using the y-coordinate is more efficient. For non-Koblitz binary curves, there are y-free formulae that are comparable in cost with at least some other efficient implementations, such as the method of Lopez and Dahab as described in the "Guide to Elliptic Curve Cryptography", Hankerson et al., pages 102-103.

It is frequently desirable in ECC to compute $k_1G_1+\ldots+k_dG_d$, using only x-coordinates, or at least mostly using only x-coordinates. Bernstein developed an algorithm for doing this when d=2. At each step, a triple of x-coordinates is computed. The three points whose x-coordinates are computed at each stage have differences of the form $l_1G_1+l_2G_2$ where $l_1, l_2 \in \{-1, 0, 1\}$. Montgomery's formula may then be used once the x-coordinates of $G_1+G_2$ and $G_1-G_2$ are found using conventional addition with y-coordinates.

In some cryptographic applications, more than two scalar multiplications are performed, e.g. in batch ECC operations. However, Bernstein's algorithm does not extend beyond d=2.

It is therefore an object of the following to obviate or mitigate the above-noted disadvantages.

SUMMARY

In one aspect, a method is provided for computing a point addition of a plurality of point multiples computed as a plurality of scalars multiplied by a plurality of points, the method being part of an elliptic curve cryptographic operation being performed in a cryptographic system. The method comprises pre-computing the x-coordinates of the points; performing a matrix phase to generate an initialization matrix, a pair of update matrices for updating the initialization matrix and a series of difference matrices; performing a point addition phase by starting with the initialization matrix and examining the update matrices to update the initialize matrix to generate at least one intermediate matrix while examining the difference matrices to evaluate the differences of the points according to Montgomery addition laws to produce an output indicative of the addition of the plurality of point multiples; and providing the output to the cryptographic operation.

In another aspect, a cryptographic module is provided that is configured to perform the steps of the above method.

BRIEF DESCRIPTION OF THE DRAWINGS

An embodiment of the invention will now be described by way of example only with reference to the appended drawings wherein.

DETAILED DESCRIPTION OF THE DRAWINGS

Figure 1:
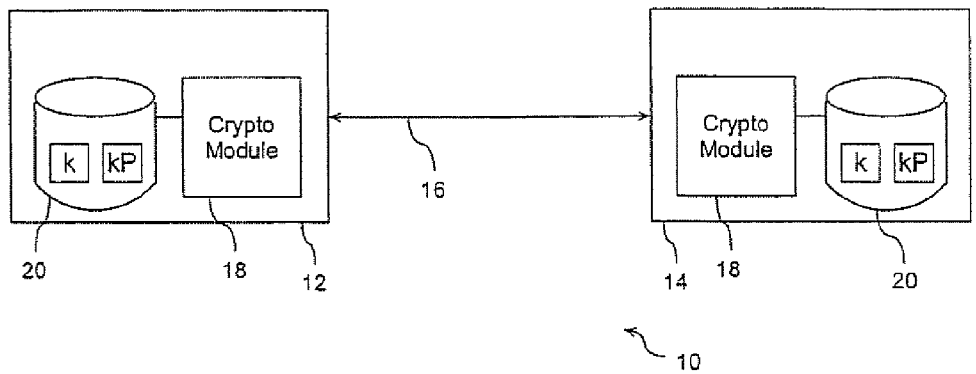
FIG. 1 is a schematic diagram of a cryptographic communication system.

The following provides an algorithm having a matrix phase and point addition phase that enables the computation of combinations of 2 or more point multiples. The algorithm has particular utility in elliptic curve cryptography (ECC) such as for computing scalar multiplications in, e.g. batch ECC operations, accelerating Lenstra's ECM factoring algorithm, exploiting expanded ECC certificates (which contain pre-computed multiples of a party's public key), incremental hashing based on elliptic curves, accelerating verification of ECDSA signatures, etc Environment—Example Cryptographic System Referring now to FIG. 1, a data communication system 10 enables the exchange of data between a first correspondent 12 and a second correspondent 14 using a data connection 16. The data connection 16 may be wired or wireless and may or may not be secure. The correspondents 12, 14 can communicate over the connection 16 securely using cryptography, e.g. ECC. Each correspondent 12, 14 has a cryptographic module 18, in this example configured to perform ECC operations, and a data storage device 20. The data storage device 20 may be used by the correspondents 12, 14 for temporary storage as well as persistent storage. For example, as shown in FIG. 1, each correspondent 12, 14 may store a private key k and a public key kP may be generated as the k-fold addition of the private key k and a seed point or generator P, using cryptographic module 18. It will be appreciated that storage device 20 generally represents any computer readable memory, whether it be considered RAM, ROM, flash memory, diskette, etc.

In a typical cryptographic operation, one of the correspondents 12, will generate an ephemeral private key k and the corresponding public key kP. This may be used to sign a message M by computing a component r which is an integer derived from the x-coordinate of kP and a signature component s, where $s=k^{-1}(e+ar)$ and e is a hash of the message M and a is the long term private key of correspondent 12. The message M and signature r, s is sent to correspondent 14 who verifies the message by computing e/sP+r/sQ, where Q is the public key of correspondent 12. This is the addition of two point multiples and provides a point X. The x-coordinate is converted to an integer and compared with r. If the values match, the signature is verified.

It will be appreciated that this is merely one example of elliptic curve operations and that other protocols can be implemented by correspondents 12, 14 using elliptic curve operations, such as those requiring the combination of more than two point multiples.

As noted above, an elliptic curve operation combining more than two point multiples is a batch ECC operation. A batch ECC operation may include, e.g. the verification of many, such as dozens, of transactions handled by several merchants, by performing a batch verification that includes, in part, a point multiplication using the public key of each participant. It can be appreciated that such a batch operation is more efficient than individually verifying each and every transaction and requires the addition of more (often many more) than two point multiples.

Overview of Multidimensional Montgomery Ladders in an ECC Operation

Figure 2:
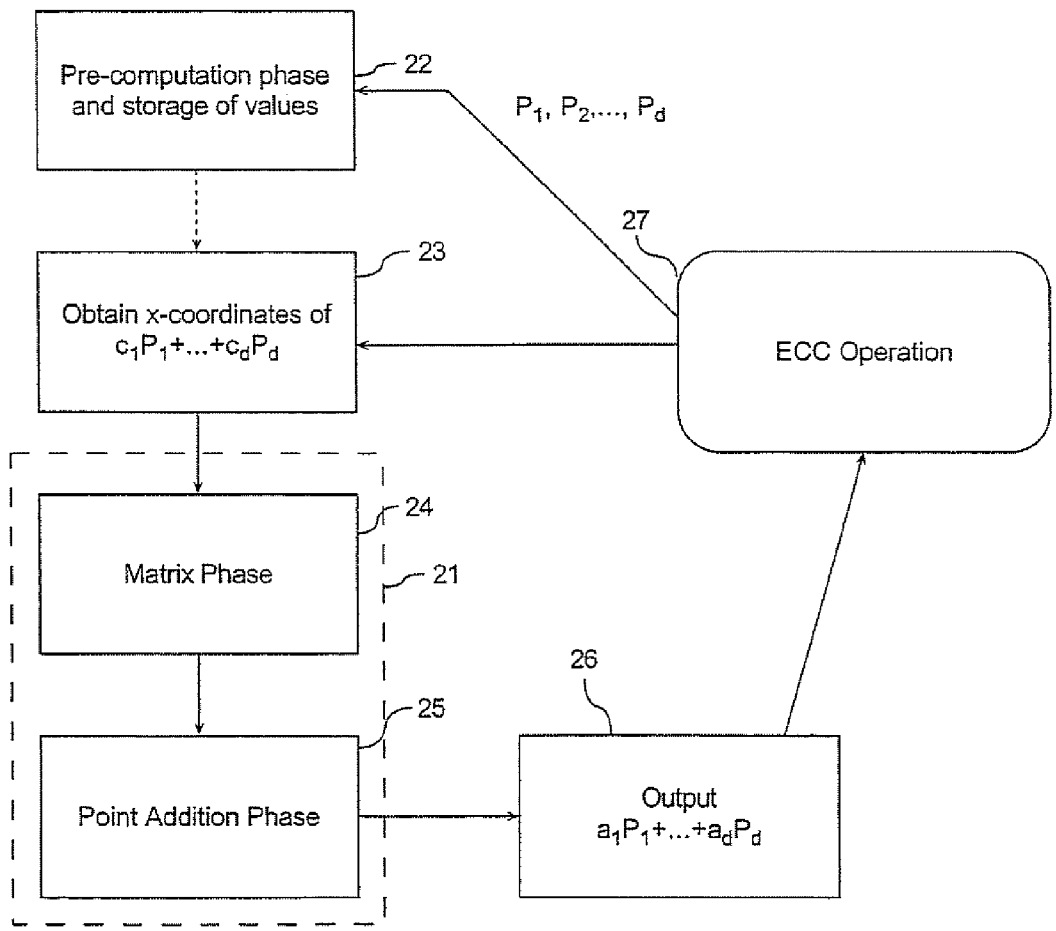
FIG. 2 is a flow diagram showing an overview of the use of a multidimensional Montgomery ladders algorithm in an ECC operation.

The following algorithm 21, depicted in FIG. 2, along with a general ECC operation provides a method for building a Montgomery ladder for adding more than two point multiples by providing a plan to obtain the x-coordinate for the sum of the points from the x-coordinates of the points and the x-coordinate of the difference of the points. To effect this in a dimension greater than two, matrices are used.

The algorithm 21 has two primary phases explained in greater detail below, namely, a matrix phase 24 and a point addition phase 25. In the matrix phase 24, a plan, or ladder, is made, which dictates the intermediate integer combinations of the points that are to be computed on the way to computing the target combination of point multiples. The matrix phase 24 uses integer matrices and does not involve any elliptic curve arithmetic. The point addition phase 25 then uses this plan, or climbs the ladder, to add points together, for the most part not using y-coordinates, unless the pre-computation phase 22 is done simultaneously with the point addition phase 25, ultimately arriving at the target integer combination of points.

Turning now to FIG. 2, any one or both of correspondents 12, 14, using the cryptographic module 18 can perform an ECC operation 27, for example a batch ECC operation that utilizes the algorithm 21 to compute $a_1P_1+\ldots+a_dP_d$, where the values $a_i$ are m-bit positive integers. The output of the algorithm 21, i.e. the combination of point multiples, may then be used by the cryptographic operation 27 in subsequent computations, verifications, etc.

Once the points involved in the combination are determined, a pre-computation and/or storage phase 22 can be performed, either before the algorithm 21 executes or during execution thereof as the values are needed. The pre-computation and storage phase 22 involves the pre-computation and storage, or a step of otherwise making available to one or both of the correspondents 12, 14, all of the $$\frac{(3^d-1)}{2}$$

x-coordinates of the points $c_1P_1+\ldots+c_dP_d$ where $c_i \in \{-1, 0, 1\}$, and the $c_i$ values are not all zero, that is, all of the possible combinations of points $P_1$ to $P_d$. These precomputed points are used during the point addition phase 25.

Prior to initiating the algorithm 21, the ECC operation first obtains the x-coordinates of the points $c_1P_1+\ldots+c_dP_d$ at step 23, which involves either executing the precomputation phase 22 or obtaining the x-coordinates from storage 20. The algorithm 21 then begins with the matrix phase 24 to generate entries for a series of allocated matrices used in the computation. The matrices generated in the matrix phase 24 are then used in the point addition phase 25 to generate an output 26 that can be fed back into or otherwise used in the ECC operation 27. The output 26 is the x-coordinate of the result of the sum of the point multiples being computed and, if desired, the cryptographic operation 27 can use the x-coordinate to obtain the corresponding y-coordinate using known methods.

Using Matrices for Multidimensional Montgomery Ladders

The use of matrices for implementing a multidimensional Montgomery ladder, exploits patterns in the intermediate steps of the computation of the combination of point multiples that are particularly suited to matrix arithmetic as shown in the following.

Matrix Phase

The following convention for indexing matrices is used herein: a matrix with d columns (rows) will have columns (rows) indexed by 1, 2, . . . , d, while a matrix with d+1 rows (columns) will have rows (columns) indexed by 0, 1, 2, . . . , d. The parameter d is called the dimension, and is the number of points that to be combined in the application of the algorithm 21. Write $M_j$ for the row of a matrix M indexed by j under the conventions stated above. Write $e_i$ for an elementary row vector that has a one in position i and zero in all other positions.

A state matrix is a $(d+1) \times d$ integer matrix S such that $S_j - S_{j+1} = \pm e_i$ for some i, and $S_j$ has j odd entries. An example state matrix is:

$$S = \begin{pmatrix} S_0 \\ S_1 \\ S_2 \\ S_3 \end{pmatrix} = \begin{pmatrix} 28 & 30 & 18 \\ 28 & 29 & 18 \\ 29 & 29 & 18 \\ 29 & 29 & 19 \end{pmatrix}$$

It may be noted that any integer row vector R is the row of some state matrix S. It may also be noted that if S is a state and i<j, the set of indices of odd entries of $S_i$ is a subset of the corresponding set for row $S_j$.

A transition matrix is a $(d+1) \times (d+1)$ integer matrix M such that $M_j = e_i + e_{i+j}$ for some i, and $M_j - M_{j+1} = \pm(e_i - e_{i+1})$ for some i. An example transition matrix is:

$$M = \begin{pmatrix} M_0 \\ M_1 \\ M_2 \\ M_3 \end{pmatrix} = \begin{pmatrix} 0 & 0 & 2 & 0 \\ 0 & 1 & 1 & 0 \\ 0 & 1 & 0 & 1 \\ 1 & 0 & 0 & 1 \end{pmatrix}$$

If M is a transition matrix and S is a state, then T=MS is a state. Also, if T is a state matrix, then there exists a unique state matrix S and unique transition matrix M, such that T=MS.

We determine the rows of M in order, $M_0, M_1, \ldots, M_d$, and the rows of S in an order to be determined. Suppose that $\frac{1}{2}T_0$ has h odd entries. This implies that $M_0 = 2e_h$ and $S_h = \frac{1}{2}T_0$. This is the base of the induction for determining the remaining rows. The induction will be on f and g such that $0 \le f \le g \le d$, starting with f=g=h. At each stage of induction, rows $S_f, S_{f+1}, \ldots, S_g$ and $M_0, \ldots, M_{g-f}$ will have been determined. Moreover we will have $M_{g-f} = e_f + e_g$.

Let j=g-f+1. By definition of transition matrices, we have $M_j \in \{e_{f-1} + e_g, e_f + e_{g+1}\}$. In order for T=MS to hold, this implies that $T_j \in \{S_{f-1} + S_g, S_f + S_{g+1}\}$. Therefore we need one of the following two equations to hold: $S_{f-1} = T_j - S_g$ and $S_{g+1} = T_j - S_f$.

Whichever of these equations is valid will determine another row of the matrix S, namely, either $S_{f-1}$ or $S_{g+1}$. If $T_j - S_g$ has f-1 odd entries then we have the equation for $S_{f-1}$. If $T_j - S_f$ has g+1 odd entries, we have the equation for $S_{g+1}$.

To show that exactly one of the conditions in $S_{f-1} = T_{j-Sg}$ or $S_{g+1} = T_j - S_f$ holds, note that $T_{j-1} = S_f + S_g$, and that $T_j$ has one more odd entry than $T_{j-1}$. The extra odd entry in $T_j$ is in a position where $S_f$ has an even entry. The entry in that position can be even or odd for $S_g$. If it is even for $S_g$, then the equation for $S_{g+1}$ holds, and if odd, the equation for $S_{f-1}$ holds.

To illustrate, the following embodiment of algorithm 21 may be applied to:

$$T = \begin{pmatrix} T_0 \\ T_1 \\ T_2 \\ T_3 \\ T_4 \end{pmatrix} = \begin{pmatrix} 24 & 28 & 18 & 22 \\ 24 & 28 & 18 & 23 \\ 24 & 29 & 18 & 23 \\ 25 & 29 & 18 & 23 \\ 25 & 29 & 19 & 23 \end{pmatrix}$$

As above, we compute the rows of M and S one at a time.
1. Row $T_0 = (24, 28, 18, 22)$, so $S_h = \frac{1}{2}T_0 = (12, 14, 9, 11)$. The number of odd entries of $S_h$ is two, so h=2, and $M_0 = 2e_2$.
2. The next row of S to compute is $T_1 - S_2 = (12, 14, 9, 12)$, which has just one odd entry, so will be $S_1$. Thus $M_1 = e_1 + e_2$.
3. The next row of S to compute is either $S_0 = T_2 - S_2$ or $S_3 = T_2 - S_1$, as above. Because $T_2 - S_1 = (12, 15, 9, 11)$ has three odd entries, $S_3$ is the choice. Thus $M_2 = e_1 + e_3$.
4. The next row of S to compute is either $S_0 = T_3 - S_3$ or $S_4 = T_3 - S_1$, depending on parity. The choice is $S_4 = T_3 - S_1 = (13, 15, 9, 11)$. Thus $M_3 = e_1 + e_4$.
5. The last of S to be determined is thus $S_0 = T_4 - S_4 = (12, 14, 10, 12)$, and as always $M_4 = e_0 + e_4$.

Therefore, $$\begin{pmatrix} 24 & 28 & 18 & 22 \\ 24 & 28 & 18 & 23 \\ 24 & 29 & 18 & 23 \\ 25 & 29 & 18 & 23 \\ 25 & 29 & 19 & 23 \end{pmatrix} = \begin{pmatrix} 0 & 0 & 2 & 0 & 0 \\ 0 & 1 & 1 & 0 & 0 \\ 0 & 1 & 0 & 1 & 0 \\ 0 & 1 & 0 & 0 & 1 \\ 1 & 0 & 0 & 0 & 1 \end{pmatrix} \begin{pmatrix} 12 & 14 & 10 & 12 \\ 12 & 14 & 9 & 12 \\ 12 & 14 & 9 & 11 \\ 12 & 15 & 9 & 11 \\ 13 & 15 & 9 & 11 \end{pmatrix}$$

For any matrix A, |A| is defined to be the maximum of the absolute values of the entries of A. If S and T are state matrices, M is a transition matrix, and T=MS, then $2|S|-1 \le |T| \le 2|S|$. The corollary is that if S and T are state matrices, M is a transition matrix, and T=MS, then either |S|<|T| or |T|=1. Also, if S and T are state matrices, M is a transition matrix, T=MS, and |T|=1, then S=T and $M = e_0 + e_j$ for all j.

Let S be a state matrix. Then S factors uniquely as a product $S = AB \ldots CT$ where: A, B, . . . , C are transition matrices, $C_0 \ne 2e_0$, and T is a state matrix with |T|=1. Conversely, every such product is a state matrix.

To illustrate, We give the following factorization:

$$\begin{pmatrix} 12 & 14 & 10 & 12 \\ 12 & 14 & 9 & 12 \\ 12 & 14 & 9 & 11 \\ 12 & 15 & 9 & 11 \\ 13 & 15 & 9 & 11 \end{pmatrix} = \begin{pmatrix} 0 & 0 & 2 & 0 & 0 \\ 0 & 1 & 1 & 0 & 0 \\ 0 & 1 & 0 & 1 & 0 \\ 1 & 0 & 0 & 1 & 0 \\ 1 & 0 & 0 & 0 & 1 \end{pmatrix} \begin{pmatrix} 0 & 0 & 2 & 0 & 0 \\ 0 & 1 & 1 & 0 & 0 \\ 0 & 1 & 0 & 1 & 0 \\ 0 & 1 & 0 & 0 & 1 \\ 1 & 0 & 0 & 0 & 1 \end{pmatrix}$$

$$\begin{pmatrix} 0 & 0 & 2 & 0 & 0 \\ 0 & 0 & 1 & 1 & 0 \\ 0 & 0 & 1 & 0 & 1 \\ 0 & 1 & 0 & 0 & 1 \\ 1 & 0 & 0 & 0 & 1 \end{pmatrix} \times \begin{pmatrix} 0 & 0 & 2 & 0 & 0 \\ 0 & 0 & 1 & 1 & 0 \\ 0 & 1 & 0 & 1 & 0 \\ 0 & 1 & 0 & 0 & 1 \\ 1 & 0 & 0 & 0 & 1 \end{pmatrix} \begin{pmatrix} 0 & 0 & 0 & 0 & 2 \\ 0 & 0 & 0 & 1 & 1 \\ 0 & 0 & 1 & 0 & 1 \\ 0 & 1 & 0 & 0 & 1 \\ 1 & 0 & 0 & 0 & 1 \end{pmatrix} \begin{pmatrix} 0 & 0 & 0 & 0 \\ 0 & 1 & 0 & 0 \\ 1 & 1 & 0 & 0 \\ 1 & 1 & 0 & 1 \\ 1 & 1 & 1 & 1 \end{pmatrix}$$

Let A be a matrix or a vector. We write $A \ge 0$ and say that A is nonnegative, if all entries of A are nonnegative If S and T are state matrices, M is a transition matrix, and T=MS, and T≥0 if and only if S≥0. Also, if T is a state matrix, then it has rank d.

The point addition phase 25 needs not only the transition matrices and the minimal state matrix, but it also needs a set of difference matrices generated in the matrix phase, so that Montgomery formula for point addition with "x-coordinates only" can be used.

Let M be a state matrix, such that its rows are of the form $M_j=e_f+e_g$ with $f \leq g$. Define $\hat{M}$ such that its rows are of the form $\hat{M}_j=e_f-e_g$. As usual, suppose that T is a state matrix factoring uniquely into as T=MS where M is a transition matrix and S is a state matrix. The difference matrix corresponding to T is the matrix $D=\hat{M}S$. We note that a difference matrix D is actually a state matrix and that $|D|=1$.

A simple rule may be used to determine the difference matrix $D=(d_{j,k})$ corresponding to state matrix $T=(t_{j,k})$. If $t_{j,k}$ is even, then $d_{j,k}=0$. Otherwise $t_{j,k} \equiv d_{j,k}$ mod 4.

One potential opportunity for improvement of the methods given above can be regarding the big integer arithmetic in the computation of the intermediate state matrices. A second opportunity is in the computation of the transition matrices in the matrix phase is in an order opposite to how they applied in the point addition phase 25, which means that matrix phase 24 has to be completed before tie addition phase 25 can begin. Therefore in the following, we discuss a way to take advantage of these opportunities to improve the efficiency of the algorithm 11.

Fix some $1 \leq c \leq d$. Let S be any state matrix S. Let S' be the matrix obtained by deleting column c and then deleting the row in which the entry of column c does not equal the value in the row below. If S is a state matrix for dimension d, then S' is a state matrix for dimension d−1.

It may be noted that if S and T are state matrices, M is a transition matrix, and T=MS, then T'=M'S' for some transition matrix M' (1).

An application of (1), is that all the integers appearing in the successive state matrices need not be computed multiple times for occurrence. Instead, one can reduce each column to dimension d=1 for computing the values of the entries. Dimension d=1 is the classical Montgomery method. An advantage of this observation is that values in the intermediate state matrix entries may be computed easily from the bit representations of the initial state matrix, as the following illustrates.

For d=1, let T be a state matrix of the form $$T = \begin{pmatrix} 2a_0 + 2a_{s+1} + 4a_{s+2} + 2^3 a_3 + \ldots \\ 1 + 2a_{s+1} + 4a_{s+2} + 2^3 a_3 + \ldots \end{pmatrix}$$

where $a_i \in \{0, 1\}$. Then for $s \geq 1$, we have:

$$T = M_{a_0+a_1} M_{a_1+a_2} \cdots M_{a_{s+1}+a_s} \begin{pmatrix} 2a_s + 2a_{s+1} + 4a_{s+2} + \ldots \\ 1 + 2a_{s+1} + 4a_{s+2} + \ldots \end{pmatrix} \quad (2)$$

where $$M_0 = M_2 = \begin{pmatrix} 2 & 0 \\ 1 & 1 \end{pmatrix} \text{ and } M_1 = \begin{pmatrix} 0 & 2 \\ 1 & 1 \end{pmatrix}.$$

This result represents a simplification to the procedure d=1, by overcoming both of the disadvantages mentioned earlier. The transition matrices can be computed using only manipulations of the bit representations of the entries of the initial state matrix T, and they can be computed in any order.

Furthermore, the intermediate state matrices do not even need to be calculated, so no big integer arithmetic is required in the matrix phase 24. The output of the matrix phase 24 only needs to include the transition matrices and the minimal state matrix.

The first step of extending the simplification to d>1, is to recognize that the value entries in each column of the $s^{th}$ intermediate state matrix may be represented by the bit values $(a_s, a_{s+1}, \ldots)$ in the notation in (2). The reduction of the intermediate state matrix modulo two, a binary matrix, together with the information $(a_s, a_{s+1}, \ldots)$, completely determines the full value of the intermediate state matrix. Therefore we may equivalently represent the state matrices $a_s$ a pair (A,B) of binary matrices, where $A=(a_{j,k})$ encodes values like as and $B=(b_{j,k})$ encodes the modulo two values of the state matrix. More precisely for state matrix S $(s_{j,k})$, we have $s_{j,k}=2a_{0,k}(1-b_{j,k}) b_{j,k}+2a_{1,k}+4a_{2,k}+2^3a_{3,k}+\ldots$.

As such, when transitioning to a smaller matrix, the effect on the A component of the state is precisely deletion of the zeroth row. Although the B component is itself a state matrix, the effect on B depends on A.

To determine the effect on B, when transitioning down, we review how the above takes a state matrix T and determines the unique transition matrix M and smaller state matrix S such that T=MS. The first step is to halve $T_0$ and examine the parity. We have $\frac{1}{2}t_{0,k}=a_{0,k}+a_{1,k}+2a_{2,k}+\ldots$. Therefore h is the number of k such that $a_{0,k}+a_{1,k}$ is odd, and $S_h=\frac{1}{2}T_0$. Let B' be the B component of S. Then we have $b'_{h,k} \equiv a_{0,k}+a_{1,k}$ mod 2. We may write this $B'_h \equiv A_0 + A_1$ mod 2.

We have determined $M_0$ and $S_h$ and $B'_h$, and next is to determine $M_1$ and $S_{h \pm 1}$ and $B'_{h \pm 1}$, for some choice of $h \pm 1$. To do this, we consider $S_{h \pm 1} = T_1 - S_h = T_1 - T_0 + S_h$. But $(T_1-T_0)_k = (2a_{0,k}-1)(b_{1,k}-b_{0,k})=2a_{0,k}-b_{1,k}$. Now $2a_{0,k}-1 \in \{-1, 1\}$, and there is a unique value of k such that $b_{1,k}=1$. Now the next row to consider is h'=h+1 if, for this unique A, we have $b'_{h,k}=0$ and otherwise the next row to consider to consider is h'=h−1. In either case, we have $B'_h \equiv B'_h + B_1$ mod 2.

When implementing the algorithm 21, it is not necessary to actually consider the transition matrices M as matrices per se, because most the entries are 0. Instead, one can compute the values of f and g for each row, so that $M_j=e_f+e_g$. In the description of the algorithm 21 provided below, the f values are put into a matrix F and the g values are put into a matrix G.

The Point Addition Phase

A row $(r_1, \ldots, r_d)$ of a state matrix S represents a point $r_1G_1 + \ldots + r_dG_d$ whose x-coordinate we may compute. The difference of any two rows of a state has the form $(l_1, \ldots, l_d)$ where $l_1, \ldots, l_d \in \{-1, 0, 1\}$. The Montgomery point addition formula will be used, with the aid of computation of $l_1G_1 + \ldots + l_dG_d$ when needed. To compute a combination $k_1G + \ldots + k_dG$, we first find a state with $(k_1, \ldots, k_d)$ as a row. From this state, we will find a sequence of successively smaller states, related transition matrices, which are defined next.

Therefore to compute $r_1G_1 + \ldots + r_dG_d$, find a state matrix T with $R=(r_1, \ldots, r_d)$ as a row. It is convenient to write $G=(G_1, \ldots G_d)$, and to write $RG=r_1G_1 + \ldots + r_dG_d$, for any such row vector R in general.

Now factor T per S=AB . . . CT described above, which can be done efficiently. For each intermediate state matrix S in the factorization, and each row $S_j$ of the state matrix, we will calculate the elliptic curve point $S_j$. Now S is obtained from a smaller state, say U, and $S_j=U_f+U_g$ for some rows of $U_f$ and $U_g$ of U. We calculate $S_jG=U_fG+U_gG$.

The following provides an implementation of the matrix phase 24 and point addition phase 25 based on the above principles for computing the sum of a plurality of point multiples. It may be noted that the above utilizes big integer arithmetic, whereas, the following algorithm 21 is structured to avoid using big integer arithmetic.

Multidimensional Montgomery Ladders—Algorithm 21

Figure 3:
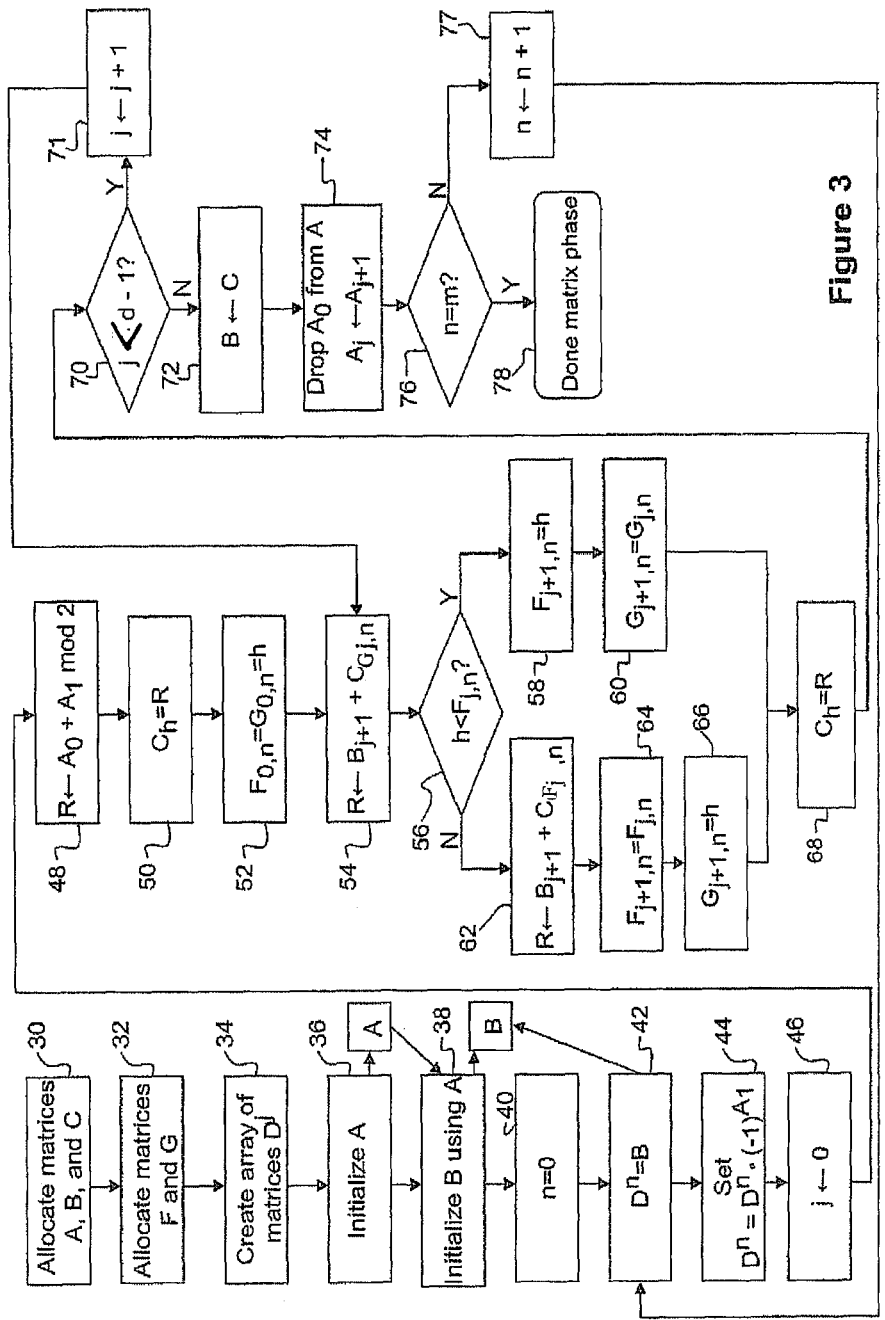
FIG. 3 is a flow diagram illustrating the matrix phase shown in FIG. 2.

FIG. 3 illustrates the steps performed in the matrix phase 24 of another embodiment of the algorithm 21. In step 30, an (m+1)×d bit matrix $A=(A_{nk})$ is allocated by the cryptographic module 18, along with two (d+1)×d bit matrices $B=(B_{jk})$ and $C=(C_{jk})$. It should be noted that the rows of matrices A and B are indicated by $A_j$ and $B_j$ respectively.

Next, at step 32, two (d+1)×d integer matrices $F=(F_{jn})$ and $G=(G_{jn})$ are allocated, with entry values that range from zero to d+1. An (m+1)-wide array of {−1,0,1}-valued (d+1)×d matrices $D^j$ is also allocated at step 34.

Once the matrices have been allocated, matrix A is then initialized at step 36 such that $a_k = A_{0,k} + 2A_{1,k} + 2^2 A_{2,k} + \ldots$. In this way, each column in A represents one of the multiples $a_k$ with the least significant bit at the top of the column. The matrix A may then be held in storage 20 for later use. Matrix B may then be initialized at step 38 as follows:

i) Let h be the number of odd entries in row $A_0$ (that is, the number of odd $a_k$);
ii) Let $B_h = A_0$;
iii) For each j<h, let $B_j$ be obtained from $B_{j+1}$ by subtracting one from a 1 valued entry (the choice of entry being arbitrary); and
iv) For each j>h, let $B_j$ be obtained from $B_{j-1}$ by adding one to a 0 valued entry (the choice of entry being arbitrary).

The algorithm 21 then proceeds by first initializing a loop from n=0 to j by first letting n=0 at step 40, letting $D''=B$ at step 42, and setting $D''=D'' \cdot (-1)^{A_1}$, which negates the columns of D with corresponding positions in $A_1$ having a value 1. The values in matrix C, and the entries of F and G are then set in steps 46-70.

In step 46, j is set to 0 and in step 48, R is set to $A_0 + A_1$ mod 2, where R is a vector for holding a value representing a particular row. By letting h be the Hamming weight of R, let $C_h$ be 5 equal to R at step 50, and at step 52, let $F_{0,n} = G_{0,n} = h$. R is then set to $B_{j+1} + C_{Gj,n}$ at step 54. The module 18 then determines if $h < F_{Gj,n}$ at step 56. If $h < F_{j,n}$, then $F_{j+1,n}$ is set to be equal to h at step 58 and $G_{j+1,n}$ is set to be equal to $G_{j,n}$ at step 60. If h is not less than $F_{j,n}$ then R is set to $B_{j+1} + C_{Fj,n}$ at step 62, $F_{j+1,n}$ is set to be equal to $F_{j,n}$ at step 64, and $G_{j+1,n}$ is set to be equal to h at step 66, after letting h be the Hamming weight of R.

At step 68, $C_h$ is then set to be equal to R, and at step 70, the module determines if j<d−1. If j<d−1, then j is set to j+1 at step 71 and the algorithm 21 returns to step 54 and the intervening steps repeated until the condition has been met. If however j is equal to d−1, then B is set to C at step 72. At step 74, the row $A_0$ is dropped from matrix A such that the rows are shifted as follows: $A_j \leftarrow A_{j+1}$.

The module 18 then determines if n=m at step 76, where m is the number of bits for each scalar. If n does not equal m, n is increased by 1 in step 77, and the algorithm 21 returns to step 42 and the intervening steps are repeated until the condition has been met. Once all D matrices have been created, then the matrix phase 24 is completed at step 78, wherein the final bit matrix B, the integer matrices F and G and the difference matrices $D^j$ are used for the point addition phase 25.

Figure 4:
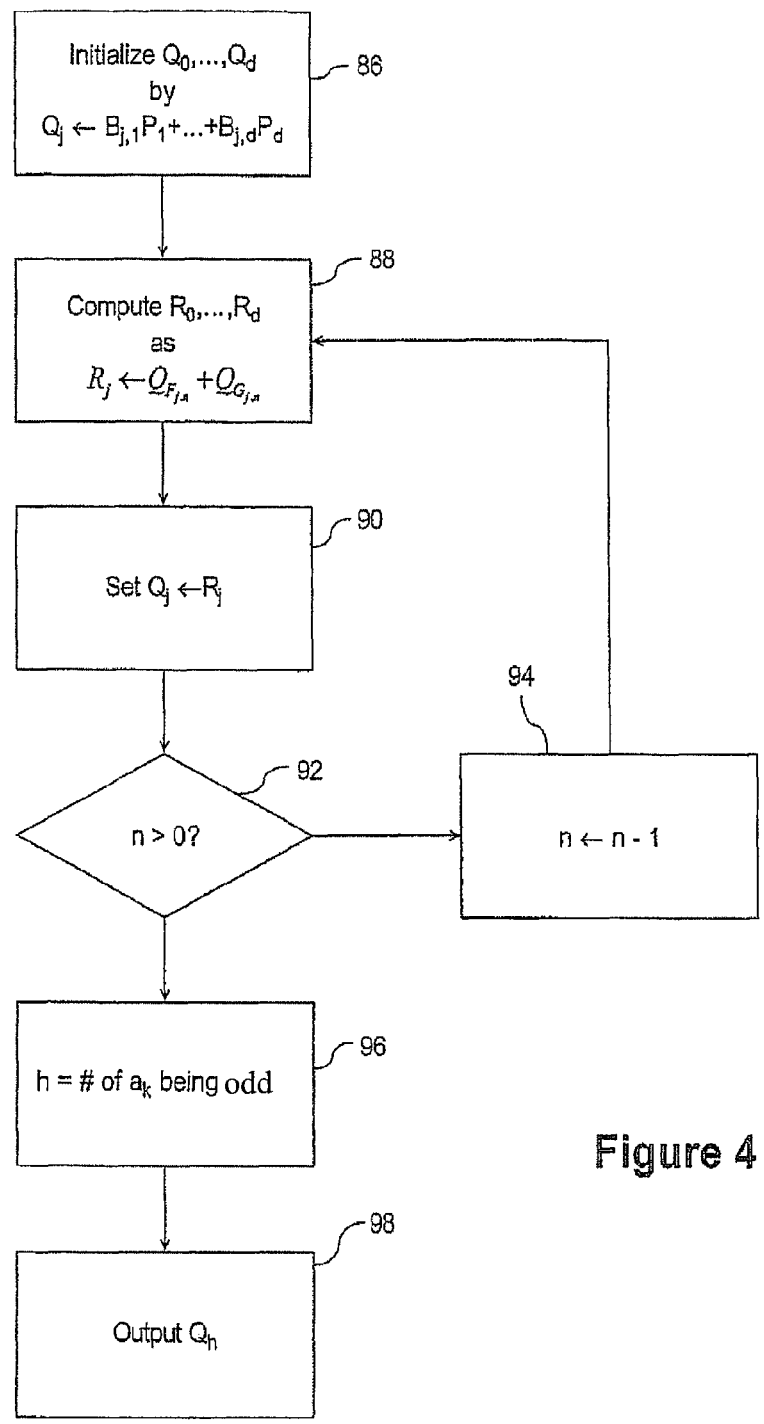
FIG. 4 is a flow diagram illustrating the point addition phase shown in FIG. 2.

The point addition phase 25 is shown in FIG. 4. At step 86, the points $Q_0, \ldots, Q_d$ are initialized by setting $Q_j$ to $B_{j,1}P_1 + \ldots + B_{j,d}P_d$. These points are among the pre-computed points that are stored and made available to the algorithm 21 during the point addition phase 25. It should be noted that $Q_0 = \infty$ and $Q_d = P_1 + \ldots + P_d$.

At step 88, the points $R_0, \ldots, R_d$ are then computed by setting $R_j$ to $Q_{Fj,n} + Q_{Gj,n}$. When computing $Q_{Fj,n} + Q_{q,n}$, the difference $Q_{Fj,n} - Q_{Gj,n}$ is given by row j of matrix D'', which means that the difference is $D''_{j,1}P_1 + D''_{j,2}P_2 + \ldots + D''_{j,d}P_d$, which is already among the pre-computed points. Thus, the y-coordinate is not needed to compute $R_j$ from the Q points. It can therefore be seen that when any two points are added in the point addition phase 25, their difference (specifically the x-coordinate of their difference) has already been computed in the pre-computation phase 22. The rows of the D matrices can thus be considered as an index used to look up where in the list of the pre-computed x-coordinates (e.g. saved in memory 20 during the pre-computation phase 22) the cryptographic module 18 can find the x-coordinate of the two points Q being added in the point addition phase 25.

The algorithm 21 then proceeds by setting $Q_j$ to $R_j$ at step 90 and determines if n>0 at step 92. If n is greater than 0, n is set to be n−1 at step 94, and the algorithm 21 returns to step 88 and the intervening steps repeated until n is equal to zero. When n is equal to zero, step 96 is performed, letting h be the number of $a_k$ that are odd at step 96 and the value $Q_h$ is output at step 98, which is equivalent to the x-coordinate of the result of the point addition that is desired.

Example Point Addition Computation

To exemplify execution of the above-described algorithm 21, the following example computes a value for $10P_1 + 14P_2 + 9P_3 + 11P_4$, i.e. where d=4.

Once the points $P_1$, $P_2$, $P_3$ and $P_4$ are determined, the pre-computations may be performed and the values stored in phase 22. In this way, all of the possible sums and differences of all combinations of the points are available for use in the point addition phase 25.

The cryptographic module 18 then allocates the matrices A, B, C, F, G and the array of matrices $D^j$.

The binary representations of the multiples 10, 14, 9 and 11 are $1010_2$, $1110_2$, $1001_2$ and $1011_2$ respectively, and the matrix A can be initialized as:

$$A = \begin{pmatrix} 0 & 0 & 1 & 1 \\ 1 & 1 & 0 & 1 \\ 0 & 1 & 0 & 0 \\ 1 & 1 & 1 & 1 \\ 0 & 0 & 0 & 0 \end{pmatrix}$$

Each column in A represents a multiple, with the least significant bit at the top and a bottom row of all zeros is appended for bookkeeping purposes. During execution of the algorithm 21, the top row of A will be discarded, but, alternatively, a pointer may be moved down a row, with the pointer being initially at the top row.

The matrix A is used in three ways in the remainder of the algorithm 21, (a) to initialize the matrix B, which is done using the top row only, (b) to update matrix B, which is done using the modulo two sum of the first and second rows, and (c) to determine the signs of the D matrices, which is done using the second row (i.e. $A_1$).

To initialize B, the top row of A ($A_0$) is first examined to determine the number of odd entries, i.e. the weight, which in this example is 2. Therefore $B_2 = A_0$ (indexing the top row with 0). Since the weight is 2, rows $B_1$ and $B_0$ (i.e. j<2) are obtained by replacing 1's with 0's and rows $B_3$ and $B_4$ (i.e. j>2) by replacing 0's with 1's. The matrix B is thus initialized from A as follows:

$$B = \begin{pmatrix} 0 & 0 & 0 & 0 \\ 0 & 0 & 0 & 1 \\ 0 & 0 & 1 & 1 \\ 0 & 1 & 1 & 1 \\ 1 & 1 & 1 & 1 \end{pmatrix}$$

For updating B and in turn determining the integer entries in the arrays F and G, matrix A is again used for computing the sum of consecutive rows therein as follows:

$A_0+A_1=(1\ 1\ 1\ 0)$ $A_1+A_2=(1\ 0\ 0\ 1)$ $A_2+A_3=(1\ 0\ 1\ 1)$ $A_3+A_4=(1\ 1\ 1\ 1)$

Matrix B may now be updated, beginning with the initial matrix B, by putting the results temporarily in matrix C at each iteration. As outlined above, R is set to be $A_0+A_1$ and, since it has a weight 3, row $C_3$ is designated (1 1 1 0) and $F_{0,0}=G_{0,0}=3$. The algorithm 21 now considers $B_1+C_3$, which equals (1 1 1 1) and has weight 4. As such, $C_4$ is then designated (1 1 1 1). Also, since h=4 is greater than $F_{0,0}=3$, R is set to $B_1+C_3=(1\ 1\ 1\ 1)$ (since $G_{j,n}=G_{0,0}=3$), which again has weight 4 and thus $F_{1,0}$, $F_{0,0}=3$ and $G_{1,0}=h=4$. The process is then repeated by incrementing by one and returning to step 54 and the remaining rows of C and the remaining entries in column I of F and G are computed. Although not specified in the algorithm 21 above, it can be observed that the entries of G cannot decrease and, as 4 is the maximum, we will have $G_{j,0}=4$ for j≥2. When G does not increase, then F decreases by one. As such, $F_{2,0}=2$, $F_{3,0}=1$ and $F_{4,0}=0$. Also, the values of F and G that differ from the previous iteration gives the index of the newly determined row of C. As such, rows $C_2=B_2+C_4$, $C_1=B_3+C_4$ and $C_0=B_4+C_4$. Now B may be updated to the new value of C as follows:

$$B \leftarrow C = \begin{pmatrix} 0 & 0 & 0 & 0 \\ 1 & 0 & 0 & 0 \\ 1 & 1 & 0 & 0 \\ 1 & 1 & 1 & 0 \\ 1 & 1 & 1 & 1 \end{pmatrix} \begin{pmatrix} 4 \\ 3 \\ 2 \\ 0 \\ 1 \end{pmatrix}$$

The column of integers provided above indicates the order in which the rows of C were computed. The matrices F and G at this point have been partially computed, namely the first column has been completed as:

$$F = \begin{pmatrix} 3 & \ldots & \ldots & \ldots \\ 3 & \ldots & \ldots & \ldots \\ 2 & \ldots & \ldots & \ldots \\ 1 & \ldots & \ldots & \ldots \\ 0 & \ldots & \ldots & \ldots \end{pmatrix} \text{ and } G = \begin{pmatrix} 3 & \ldots & \ldots & \ldots \\ 4 & \ldots & \ldots & \ldots \\ 4 & \ldots & \ldots & \ldots \\ 4 & \ldots & \ldots & \ldots \\ 4 & \ldots & \ldots & \ldots \end{pmatrix}$$

The value for n is then incremented, namely to 1 at this point and thus the next column of F and G will be computed in the next iteration. It can be appreciated that since $A_0$ is dropped at the end of each iteration, the next $A_0+A_1$ in the algorithm 21 actually corresponds to $A_1+A_2$ computed above. As mentioned above, rather than dropping $A_0$, the algorithm 21 can use pointers to navigate through A. Also, as will be discussed below, the values of each update for B should be stored by the cryptographic module IS for later use in determining the matrices $D^j$. By repeating the above process, R is first set to (1 0 0 1), which means $C_2=(1\ 0\ 0\ 1)$, and matrix B is then updated in the next iteration to:

$$B \leftarrow C = \begin{pmatrix} 0 & 0 & 0 & 0 \\ 0 & 0 & 0 & 1 \\ 1 & 0 & 0 & 1 \\ 1 & 1 & 0 & 1 \\ 1 & 1 & 1 & 1 \end{pmatrix} \begin{pmatrix} 4 \\ 1 \\ 0 \\ 2 \\ 3 \end{pmatrix}$$

The column to the right of the matrix update above again indicates the order in which the rows of B are updated. The second columns of matrices F and G are also updated as follows:

$$F = \begin{pmatrix} 3 & 2 & \ldots & \ldots \\ 3 & 1 & \ldots & \ldots \\ 2 & 1 & \ldots & \ldots \\ 1 & 1 & \ldots & \ldots \\ 0 & 0 & \ldots & \ldots \end{pmatrix} \text{ and } G = \begin{pmatrix} 3 & 2 & \ldots & \ldots \\ 4 & 2 & \ldots & \ldots \\ 4 & 3 & \ldots & \ldots \\ 4 & 4 & \ldots & \ldots \\ 4 & 4 & \ldots & \ldots \end{pmatrix}$$

B is then updated in the next iteration to;

$$B \leftarrow C = \begin{pmatrix} 0 & 0 & 0 & 0 \\ 0 & 0 & 1 & 0 \\ 1 & 0 & 1 & 0 \\ 1 & 0 & 1 & 1 \\ 1 & 1 & 1 & 1 \end{pmatrix} \begin{pmatrix} 4 \\ 2 \\ 1 \\ 0 \\ 3 \end{pmatrix}$$

with F and G being further updated as follows:

$$F = \begin{pmatrix} 3 & 2 & 3 & \ldots \\ 3 & 1 & 2 & \ldots \\ 2 & 1 & 1 & \ldots \\ 1 & 1 & 1 & \ldots \\ 0 & 0 & 0 & \ldots \end{pmatrix} \text{ and } G = \begin{pmatrix} 3 & 2 & 3 & \ldots \\ 4 & 2 & 3 & \ldots \\ 4 & 3 & 3 & \ldots \\ 4 & 4 & 4 & \ldots \\ 4 & 4 & 4 & \ldots \end{pmatrix}$$

The final update modifies B to:

$$B \leftarrow C = \begin{pmatrix} 0 & 0 & 0 & 0 \\ 0 & 1 & 0 & 0 \\ 0 & 1 & 0 & 1 \\ 1 & 1 & 0 & 1 \\ 1 & 1 & 1 & 1 \end{pmatrix} \begin{pmatrix} 4 \\ 3 \\ 2 \\ 1 \\ 0 \end{pmatrix}$$

with F and G being finalized as follows:

$$F = \begin{pmatrix} 3 & 2 & 3 & 4 \\ 3 & 1 & 2 & 3 \\ 2 & 1 & 1 & 2 \\ 1 & 1 & 1 & 1 \\ 0 & 0 & 0 & 0 \end{pmatrix} \text{ and } G = \begin{pmatrix} 3 & 2 & 3 & 4 \\ 4 & 2 & 3 & 4 \\ 4 & 3 & 3 & 4 \\ 4 & 4 & 4 & 4 \\ 4 & 4 & 4 & 4 \end{pmatrix}$$

As noted above, the example provided herein has thus far deferred computation of the D matrices. This is deferred since in this example, the values obtained for B at each update may be examined and their signs adjusted using the rows of A to produce the D matrices. Therefore, since $A_1$ changes with each iteration once $A_0$ is dropped, the cryptographic module 18 should store the sums of consecutive rows in A that are listed above. For each D matrix, the corresponding B and row-sum from A can be used to compute the D matrix, namely by setting $D''$ to B at step 42 and then adjusting the signs of $D''$ in step 44 as outlined in FIG. 3.

In this example, the difference matrices are:

$$D^0 = \begin{pmatrix} 0 & 0 & 0 & 0 \\ 0 & 0 & 0 & -1 \\ 0 & 0 & 1 & -1 \\ 0 & -1 & 1 & -1 \\ -1 & -1 & 1 & -1 \end{pmatrix}$$

$$D^1 = \begin{pmatrix} 0 & 0 & 0 & 0 \\ 1 & 0 & 0 & 0 \\ 1 & -1 & 0 & 0 \\ 1 & -1 & 1 & 0 \\ 1 & -1 & 1 & 1 \end{pmatrix}$$

$$D^2 = \begin{pmatrix} 0 & 0 & 0 & 0 \\ 0 & 0 & 0 & -1 \\ -1 & 0 & 0 & -1 \\ -1 & -1 & 0 & -1 \\ -1 & -1 & -1 & -1 \end{pmatrix}$$

$$D^3 = \begin{pmatrix} 0 & 0 & 0 & 0 \\ 0 & 0 & 1 & 0 \\ 1 & 0 & 1 & 0 \\ 1 & 0 & 1 & 1 \\ 1 & 1 & 1 & 1 \end{pmatrix}$$

which are obtained by taking the successive B matrices (excluding the final B matrix) and negating the columns where the corresponding rows of A (excluding the top row) have a one.

For example, the initial B matrix was:

$$B = \begin{pmatrix} 0 & 0 & 0 & 0 \\ 0 & 0 & 0 & 1 \\ 0 & 0 & 1 & 1 \\ 0 & 1 & 1 & 1 \\ 1 & 1 & 1 & 1 \end{pmatrix}$$

and $A_1 = (1\ 1\ 0\ 1)$ at the first iteration. This results in a replacement of each 1 in the first, second and fourth columns of B with a $-1$, which as can be seen above corresponds to $D^0$. This can be repeated for each version of B and the corresponding $A_1$ at that point. Alternatively, the cryptographic module 18 can compute the D matrices at steps 42 and 44, namely prior to computing the next column of F and G as shown in FIG. 3. When the D matrices are computed at each iteration, storage of the B values and the $A_1$ rows can be avoided by instead computing and storing the D matrix and then overwriting the values in B and discarding the top row of A until the final version of B is obtained.

The final B matrix, the integer matrices F and G and the difference matrices $D^0, D^1, D^2$ and $D^3$ are retained in memory 20 for the point addition phase 25. The final matrix B is used to initialize the sequence of points, the matrices F and G determine how to update the sequence of points at each iteration by virtue of which elements to add, and the matrices $D^j$ determine the differences of the points being added. This is needed to satisfy the 'x-only' laws of Montgomery addition.

At step 86 in FIG. 4, it can be seen that the Q points are initialized using the B matrix. For example, $Q_0 = \infty$, $Q_1 = B_{1,1}P_1 + B_{1,2}P_2 + B_{1,3}P_3 + B_{1,4}P_4 = P_2$, $Q_2 = P_2 + P_4$ $Q_3 P_1 + P_2 + P_4$ and $Q_4 = P_1 + P_2 + P_3 + P_4$.

A loop then begins having n iterations. The value for n is carried forward from the matrix phase 24 and in this example is 4 (since m=4). The R points are then computed at step 88, using the matrices F and G and beginning with n=4. For example,
$R_0 = Q_{F_{0,4}} + Q_{G_{0,4}} = Q_4 + Q_4 = 2(P_1 + P_2 + P_3 + P_4)$ and
$R_2 = Q_{F_{2,4}} + Q_{G_{2,4}} = Q_2 + Q_4 = P_1 + 2P_2 + P_3 + 2P_4$ in the first iteration. This step involves Montgomery addition, in that the the x-coordinates of $Q_2$ and $Q_4$, and the x-coordinates of their difference is used. The difference in this case above is the x-coordinate of $P_1 + P_3$ as explained below.

The difference $Q_{F_{j,n}} - Q_{G_{j,n}}$ at each iteration is provided by row of the matrix $D^n$. As such, in this example, for $R_2$ in the first iteration (i.e. n=4), $Q_{F_{j,n}} - Q_{G_{j,n}} = P_1 + P_3$. The difference above therefore matches row 2 in $D^3$. The x-coordinate of $P_1 + P_3$, which is the difference of the two points we currently want to add, has been computed in the pre-computation phase 22. Therefore, because we have the x-coordinates of the two points being added, and the x-coordinate of their difference, we can use the special Montgomery addition law (noted above) to compute the x-coordinate of the sum of the two points we wish to add.

The entire point addition phase 25 can also be computed using an array of matrices beginning with the final version of matrix B, which can be summarized in the following:

$$\begin{pmatrix} 0 & 0 & 0 & 0 \\ 0 & 1 & 0 & 0 \\ 0 & 1 & 0 & 1 \\ 1 & 1 & 0 & 1 \\ 1 & 1 & 1 & 1 \end{pmatrix} \rightarrow$$

$$\begin{pmatrix} 2 & 2 & 2 & 2 \\ 2 & 2 & 1 & 2 \\ 1 & 2 & 1 & 2 \\ 1 & 2 & 1 & 1 \\ 1 & 1 & 1 & 1 \end{pmatrix} \rightarrow \begin{pmatrix} 2 & 4 & 2 & 2 \\ 2 & 4 & 2 & 3 \\ 3 & 4 & 2 & 3 \\ 3 & 3 & 2 & 3 \\ 3 & 3 & 3 & 3 \end{pmatrix} \rightarrow \begin{pmatrix} 6 & 8 & 4 & 6 \\ 5 & 8 & 4 & 6 \\ 5 & 7 & 4 & 6 \\ 5 & 7 & 5 & 6 \\ 5 & 7 & 5 & 5 \end{pmatrix} \rightarrow \begin{pmatrix} 10 & 14 & 10 & 12 \\ 10 & 14 & 10 & 11 \\ 10 & 14 & 9 & 11 \\ 10 & 15 & 9 & 11 \\ 11 & 15 & 9 & 11 \end{pmatrix}$$

Each row in each of the above matrices gives $(r_1\ r_2\ r_3\ r_4)$ and thus when multiplied with a column vector $$\begin{pmatrix} P_1 \\ P_2 \\ P_3 \\ P_4 \end{pmatrix}$$

represents the computation of the point $r_1P_1 + \ldots + r_4P_4$ in this example.

The first matrix above is the final version of B. To obtain the subsequent matrices, the columns of matrices F and G and the matrices $D^j$ are used in the reverse order in which they were obtained in the matrix phase 24. Using the example above, to obtain the third row of the second matrix ($R_2$ above), the third row of the last column in F and G are determined to be 2 and 4 respectively. Therefore, the second and fourth rows of the first matrix are added as (0 1 0 1)+(1 1 1 1)=(1 2 1 2). It can be appreciated that integer vector arithmetic is now used instead of in modulo two. As such, there is actually only a single point addition as follows:

$$(P_2+P_4)+(P_1+P_2+P_3+P_4)=P_1+2P_2+P_3+2P_4$$

where the additions inside the parenthesis on the left hand side were already performed in the initialization step 86 and the additions on the right hand side are achieved implicitly by the left hand side additions. The only point addition that is actually performed in the point addition phase 25 is the one between the parenthesis on the left hand side. The difference may also be computed as (1 1 1 1)−(0 1 0 1)=(1 0 1 0), which is row 2 of the last difference matrix, $D^3$. We can then use (1 0 1 0) as an index for the table of pre-computed x-coordinates computed in the pre-computation phase 22. In this case, (1 0 1 0) indexes the x-coordinate of $P_1+P_3$.

To complete each iteration, each $Q_j$ is set to $R_j$ for each j, which corresponds to the next matrix in the array. The last matrix therefore contains the final versions of $Q_j$. For example, $Q_2$ in the final form is (10 14 9 11)=$10P_1+14P_2+9P_3+11P_4$ Once all iterations have been completed, i.e. when n=0, the value h corresponds to the number of scalars $a_k$ that are odd since h is the Hamming weight. In this example, there are two odd scalars (9 and 11) and thus h=2 The output is then $Q_h=Q_2$, which is defined above. The point addition phase 25 thus computes the x-coordinate of $Q_h$. This is the final output of the algorithm 21, that is, the x-coordinate of $Q_h$. It can be seen therefore that the row value in the last matrix in the array defined by h corresponds to the point addition desired. $Q_h$ is then output and represents the final computation.

Possible Algorithm Modifications

It may be observed from the above example, and from matrix theory, that some steps of the algorithm 21 can be simplified. For example, the top row of B is always all zeros and the bottom row always all ones. Similarly, the bottom row of F is all zeros and the bottom row of G is all equal to d, i.e. the number of points being added. The top rows of F and G are identical and are determined by the weights of the sums of successive rows of A. Since the columns of F weakly fall and the columns of G weakly rise, with exactly one rise or fall between rows, it follows that a single bit can be used to indicate whether F falls or G rises. Therefore, integers can be used for only the common top row of F and G, while bits can be used for the remaining entries, if there is an advantage that can be experienced from doing so.

It can therefore be seen that the algorithm 21 can be modified to achieve efficiencies depending on the nature of the application and implementation and, as such, portions of the algorithm 21 described above may be implemented separately and need not necessarily be implemented as a whole at the same time.

Although the invention has been described with reference to certain specific embodiments, various modifications thereof will be apparent to those skilled in the art without departing from the spirit and scope of the invention as outlined in the claims appended hereto.

The invention claimed is:

1. A method for computing a point addition of more than two point multiples, each of the point multiples comprising a point multiplied by a scalar, as part of an elliptical curve cryptographic operation being performed in a cryptographic system, the method comprising:
   a) initializing a first matrix A with, for each scalar, a column of m bits of a binary representation of that scalar with a padding zero added to a last row of that column;
   b) generating an initial state matrix B based on the first matrix A;
   c) generating from the first matrix A and the initial state matrix B:
      a pair of transition matrices F and G,
      a final state matrix, and
      m difference matrices,
      wherein said generating from the first matrix A and the initial state matrix B comprises iteratively computing a one of said columns for each of said pair of transition matrices, an updated state matrix and a difference matrix for that iteration, and wherein said updated state matrix for a last iteration comprises said final state matrix; and,
   e) computing an x-coordinate of the point addition by iteratively generating iterated updated final state matrices, starting with the final state matrix using the pair of transition matrices and evaluating differences in points according to Montgomery addition using the difference matrices.

2. The method of claim 1 wherein the method further comprises pre-computing and storing x-coordinates of the points $c_1P_1+\ldots+c_dP_d$, $c_i \in \{-1,0,1\}$, said stored x-coordinates for use in said evaluating differences in points.

3. A non-transitory computer readable storage medium having stored thereon a computer program for execution by a computing device to compute a point addition of more than two point multiples, each of the point multiples comprising a point multiplied by a scalar, as part of an elliptical curve cryptographic operation being performed by the computing device, the computer program comprising instructions for causing the computing device to perform the steps of:
   a) initializing a first matrix A with, for each scalar, a column of m bits of a binary representation of that scalar with a padding zero added to a last row of that column;
   b) generating an initial state matrix B based on the first matrix A;
   c) generating from the first matrix A and the initial state matrix B:
      a pair of transition matrices F and G,
      a final state matrix, and
      m difference matrices,
      wherein said generating from the first matrix A and the initial state matrix B comprises iteratively computing a one of said columns for each of said pair of transition matrices, an updated state matrix and a difference matrix for that iteration, and wherein said updated state matrix for a last iteration comprises said final state matrix; and,
   e) computing an x-coordinate of the point addition by iteratively generating iterated updated final state matrices, starting with the final state matrix using the pair of transition matrices and evaluating differences in points according to Montgomery addition using the difference matrices.

4. The non-transitory computer readable medium of claim 3, wherein the instructions further cause the computing device to perform the steps of: pre-computing and storing x-coordinates of the points $c_1P_1+\ldots+c_dP_d$, $c_i \in \{-1,0,1\}$, said stored x-coordinates for use in said evaluating differences in points.

\* \* \* \* \*